United States Patent
Liikanen et al.

(10) Patent No.: US 7,136,253 B1
(45) Date of Patent: Nov. 14, 2006

(54) METHOD AND APPARATUS FOR PROVIDING MULTI-POINT POSITION DEMODULATION OF A READ HEAD WHEN USING SPIRAL-WRITTEN SERVO INFORMATION

(75) Inventors: Bruce Liikanen, Berthoud, CO (US); John VanLaanen, Louisville, CO (US)

(73) Assignee: Maxtor Corporation, Longmont, CO (US)

(*) Notice: Subject to any disclaimer, the term of this patent is extended or adjusted under 35 U.S.C. 154(b) by 244 days.

(21) Appl. No.: 10/858,847

(22) Filed: Jun. 2, 2004

Related U.S. Application Data (60) Provisional application No. 60/475,049, filed on Jun. 2, 2003.

(51) Int. Cl.
*G11B 5/596* (2006.01)
*G11B 21/02* (2006.01)

(52) U.S. Cl. .............. 360/77.11; 360/75; 360/77.04; 360/77.07

(58) Field of Classification Search .............. None
See application file for complete search history.

(56) References Cited

U.S. PATENT DOCUMENTS

| | | | |
|---|---|---|---|
| 5,668,679 A * | 9/1997 | Swearingen et al. | 360/75 |
| 6,144,517 A * | 11/2000 | Watanabe et al. | 360/77.04 |
| 6,704,156 B1 * | 3/2004 | Baker et al. | 360/75 |

* cited by examiner

*Primary Examiner*—Andrew L. Sniezek
(74) *Attorney, Agent, or Firm*—Tejpal S. Hansra

(57) ABSTRACT

The present invention is directed to a method and apparatus for providing multi-point position demodulation of a read head when using spiral-written servo information. In one embodiment, a disk surface has spiral servo information written thereon. A read head generates a read signal envelope when reading the spiral servo information. A read signal envelope is detected within an integration window and integration values are accumulated over the integration window. The accumulated integration values are multiplied by a first number associated with a first integrator value and a second number associated with a second integrator value. A first position error signal associated with the first integrator value is determined, and a second position error signal associated with the second integrator value is also determined. A final position error signal is determined using the first position error signal and the second position error signal.

22 Claims, 10 Drawing Sheets

METHOD AND APPARATUS FOR PROVIDING MULTI-POINT POSITION DEMODULATION OF A READ HEAD WHEN USING SPIRAL-WRITTEN SERVO INFORMATION

CROSS-REFERENCE TO RELATED APPLICATIONS

Priority is claimed from U.S. Provisional Patent Application Ser. No. 60/475,049 filed Jun. 2, 2003, which is incorporated herein by reference in its entirety.

FIELD OF THE INVENTION

The present invention relates generally to data storage devices, such as disk drives. More particularly, the present invention relates to a method and apparatus for providing multi-point position demodulation of a read head when using spiral-written servo information.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

Figure 1:
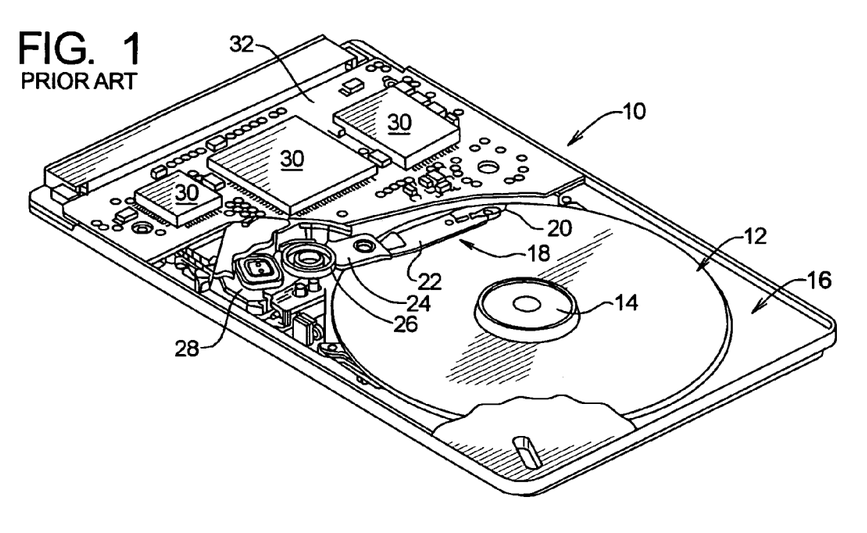
FIG. 1 is a diagrammatic representation illustrating a conventional disk drive with its top cover removed.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

Figure 2:
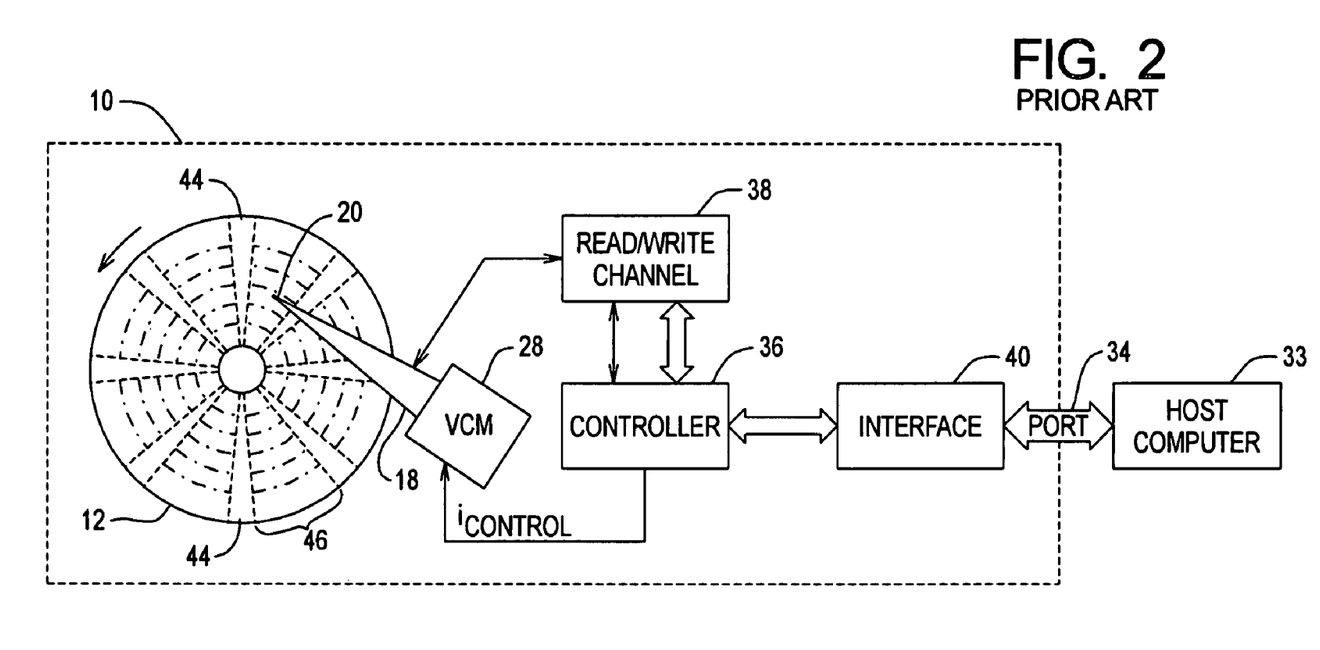
FIG. 2 is a functional block diagram which illustrates a conventional disk drive that is coupled to a host computer via an input/output port.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$, generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

Figure 3:
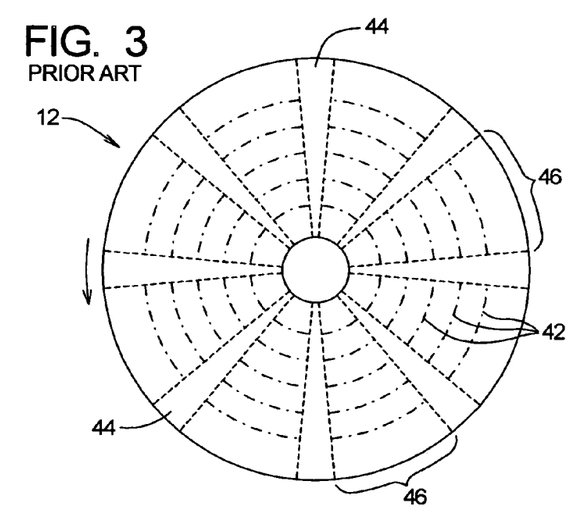
FIG. 3 is a diagrammatic representation of a top view of a magnetic storage disk illustrating a typical organization of data on a disk surface.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from the outer diameter of the disk to the inner diameter of the disk (or visa-versa) as the disk spins.

Figure 4:
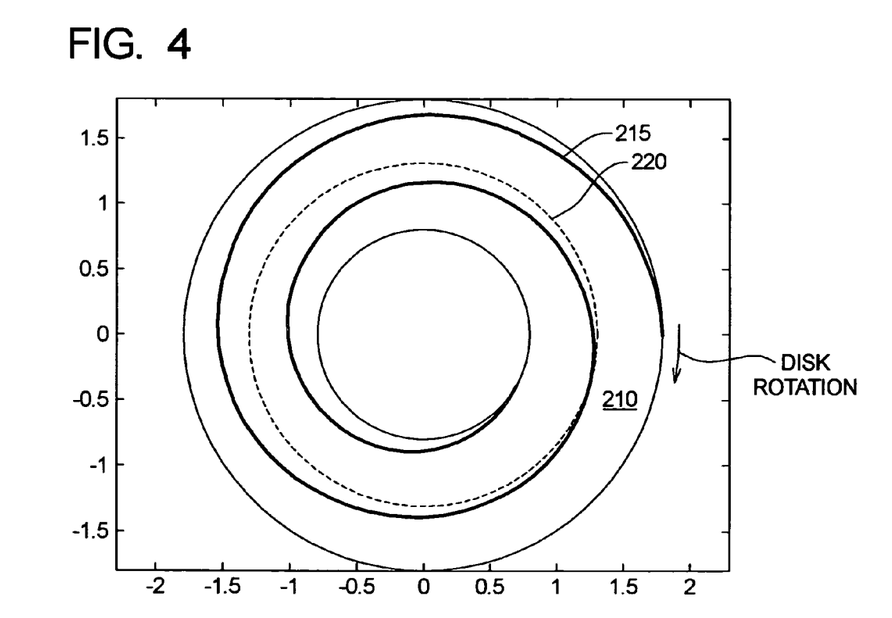
FIG. 4 is a diagrammatic representation of a disk surface having a spiral of servo information written thereon, along with a circular data storage track.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

Figure 5:
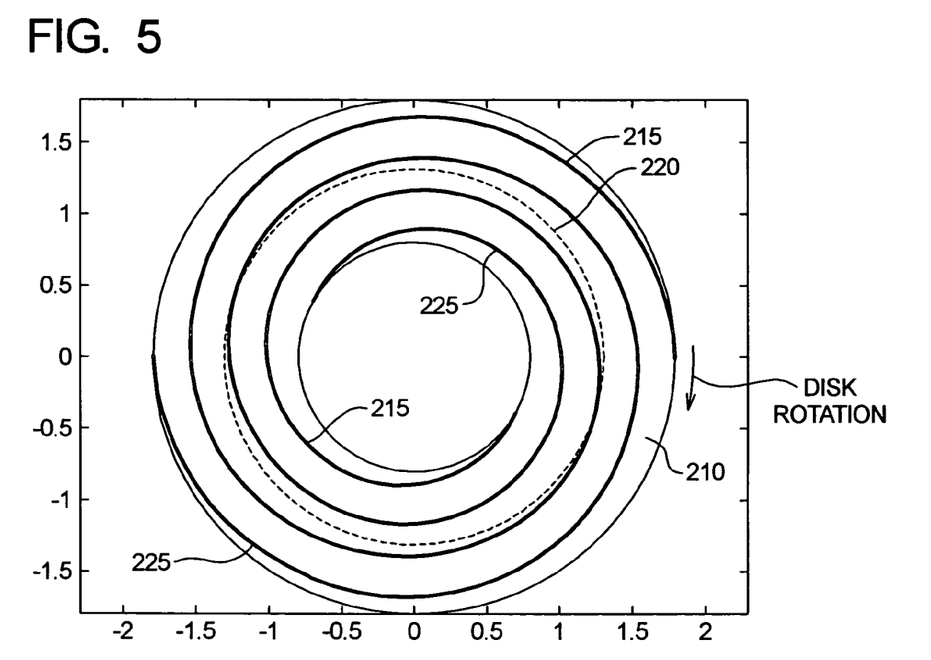
FIG. 5 is a diagrammatic representation of a disk surface having two spirals of servo information written thereon, along with a circular data storage track.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals may be written on the disk surface 110. Accordingly, by writing servo information in a spiral fashion, the time necessary to write servo information on disk surface 110 using the STW is a function of the servo sample rate (i.e., the number of spirals of servo information to be written) rather than the number of tracks.

Figure 6:
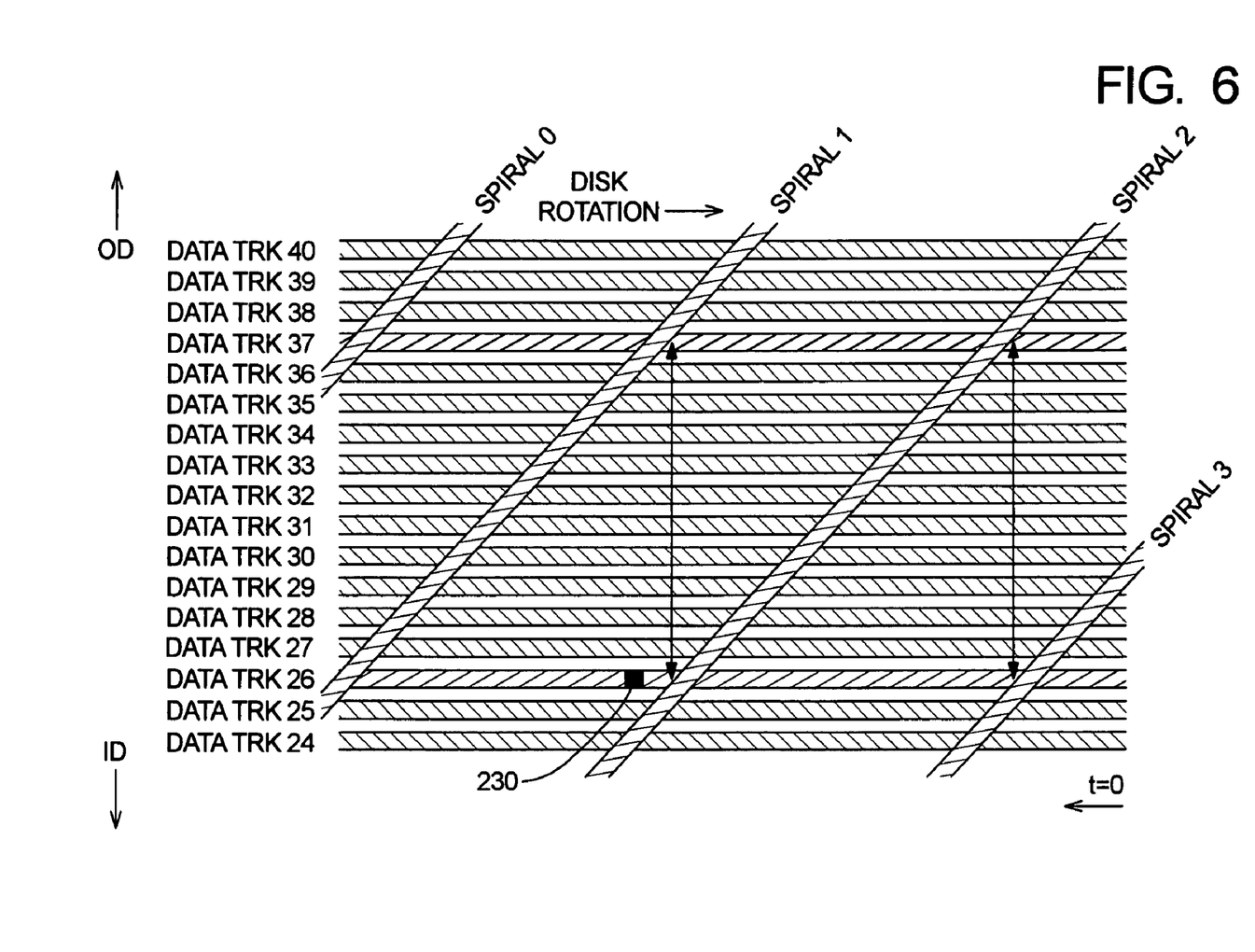
FIG. 6 is a diagrammatic representation of a magnified view of a portion of FIG. 5 showing additional spirals of servo information in a linear, instead of arcuate fashion, for ease of depiction.

FIG. 6 is a diagrammatic representation of a magnified view of a portion of FIG. 5 showing additional spirals of servo information (i.e., portions of four spirals are shown in FIG. 6). Furthermore, FIG. 6 is shown in a linear, instead of arcuate fashion, for ease of depiction.

At any given track 220 (Data Tracks 24–40 are depicted in FIG. 6), the disk drive's read head 230 (also referred to herein as the reader) will cross over the spirals of servo information at intervals equal to the sample rate. Furthermore, the read head 230 will cross over the spirals of servo information at an angle. Additionally, the number of spirals of servo information that cross each of the tracks 220 will be equivalent. For a given track 220, the spacing between adjacent spirals of servo information will be approximately equidistant.

It should be noted that a read head 230 placed on a track 220 closer to the inner diameter (ID) of the disk surface 210 will cross a given spiral of servo information at a time slightly delayed from a track 220 closer to the outer diameter (OD) of the disk surface. For example, suppose that: (1) time zero (t=0) is defined towards the right side of FIG. 6; (2) time increases in the figure from right to left along the horizontal; and, (3) the disk is rotating in the direction indicated by corresponding arrow shown in FIG. 6. If the read head 230 was placed above Data Track 26 at time zero and the disk was rotated, the read head 230 would cross Spiral 2 at a point later in time than if the read head 230 was placed on Data Track 37 under similar conditions, since Data Track 26 is closer to the inner diameter than Data Track 37.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for its entire stroke (i.e., from OD to ID or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, STW Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 1 microinch along each spiral.

Each sync mark along a given spiral corresponds to a unique radius. Accordingly, the sync marks may be used to accurately position a transducer of a disk drive over the disk surface.

Figure 7:
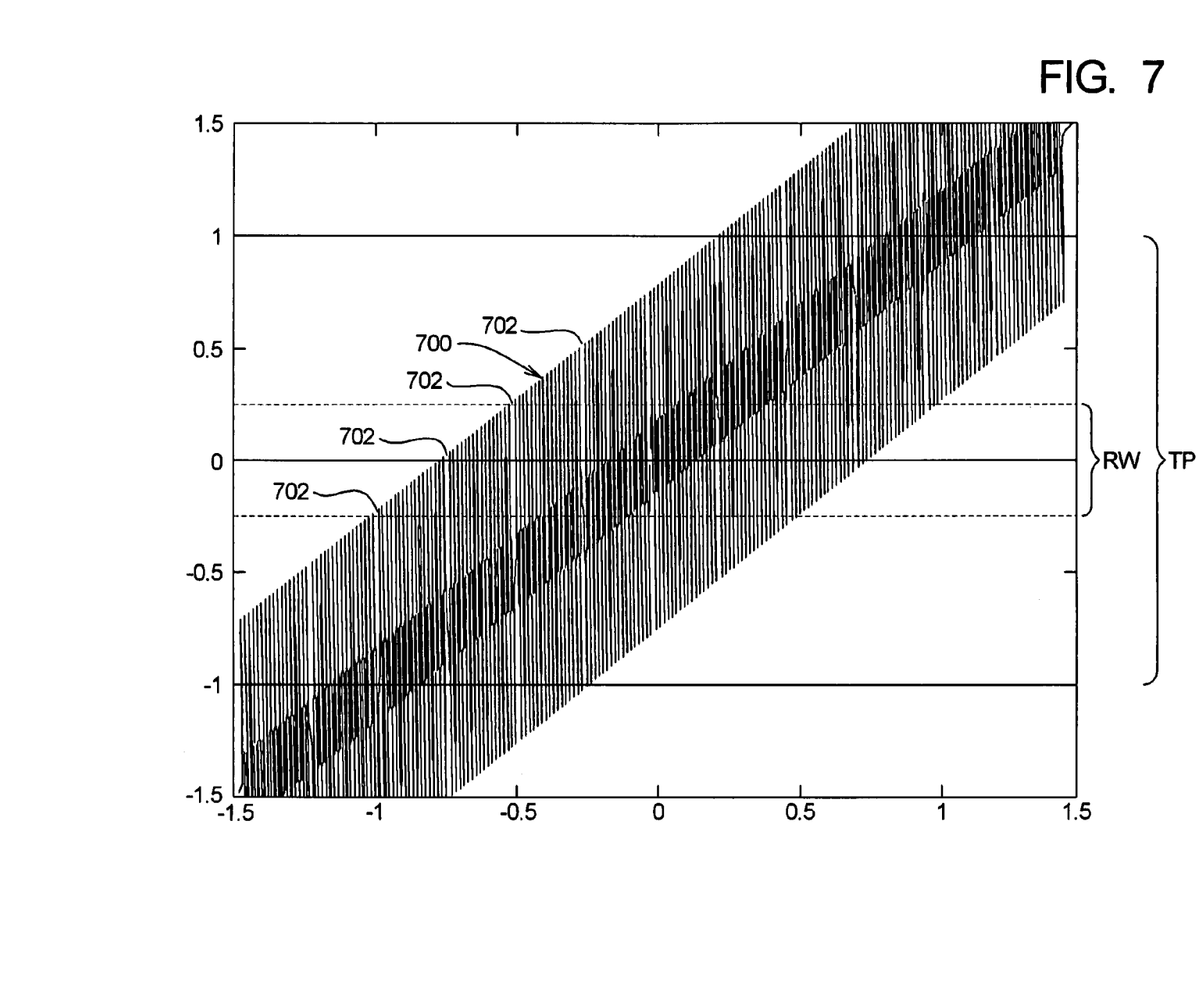
FIG. 7 is a diagrammatic representation of a magnified portion of one of the spirals of servo information shown in FIG. 6.

FIG. 7 is a diagrammatic representation of a magnified portion of one of the spirals of servo information shown in FIG. 6. FIG. 7 is intended to provide a representation of the track pitch (TP) of a circumferential data track and the reader width (RW). The spiral 700 is a continuous, single-frequency pattern having sync marks 702 embedded therein. The sync marks 702 constitute phase shifts within the spiral pattern. In FIG. 7, the sync marks 702 are shown as regularly-space white areas within the spiral 700.

Figure 8:
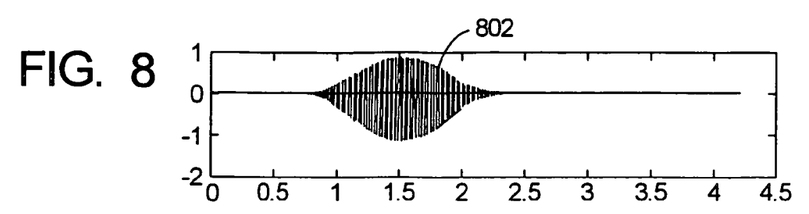
FIG. 8 is a diagrammatic representation of a read signal that is generated as the reader reads a portion of a spiral of servo information while the disk is spinning.

FIG. 8 is a diagrammatic representation of a read signal that is generated as the reader 230 reads a portion of a spiral of servo information while the disk is spinning. In FIG. 8, the x-axis represents time, while the y-axis represents signal amplitude. The depicted shape is known herein as the read signal envelope 802.

In general, the shape of each read signal envelope 802 will be approximately the same (e.g., roughly a football shape) over the entire disk surface. The position of the read signal envelope in time changes based upon the position of the reader 230. Although the read signal envelope moves relative to the position of the reader 230, the sync pattern within the spiral being read does not move. Accordingly, the envelope moves relative to the sync marks. Since the sync marks are at known radial positions, the sync marks provide a position reference.

A position error signal (PES) is determined by calculating the position of the reader relative to a known reference point (i.e., one of the sync marks) within the spiral servo pattern. The position of the reader is given by the centroid of the read signal envelope and is determined by integrating the read signal envelope over a hardware integration window of fixed-size (described in more detail below) to determine the read signal envelope's area (i.e., by performing a power integration) and, then, dividing by two. This is known as the half-integrator value.

Figure 9:
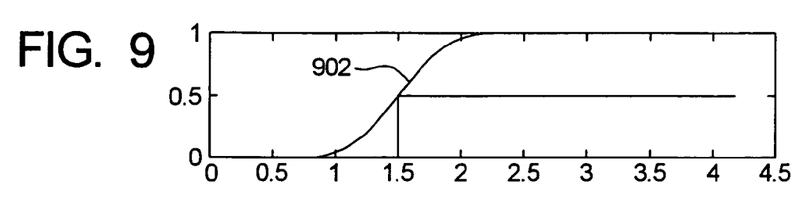
FIG. 9 is a diagrammatic representation of an integration curve in normalized units.

A diagrammatic representation of an integration curve 902 in normalized units is shown in FIG. 9. The position of the reader is at 1.5 arbitrary units along the x-axis, where half of the integrated value of the read signal envelope is to the right of the position of the reader and half of the integrated value of the read signal envelope is to the left of the position of the reader.

Figure 10:
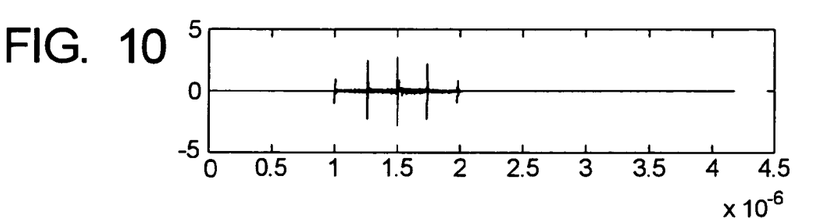
FIG. 10 is a diagrammatic representation illustrating five (5) sync marks in a read signal envelope.

As mentioned above, once the position of the reader is determined (i.e., by determining the half-integration value), the PES is determined by comparing the position of the reader relative to one of the sync marks. FIG. 10 is a diagrammatic representation illustrating five (5) sync marks in the read signal envelope.

Figure 11:
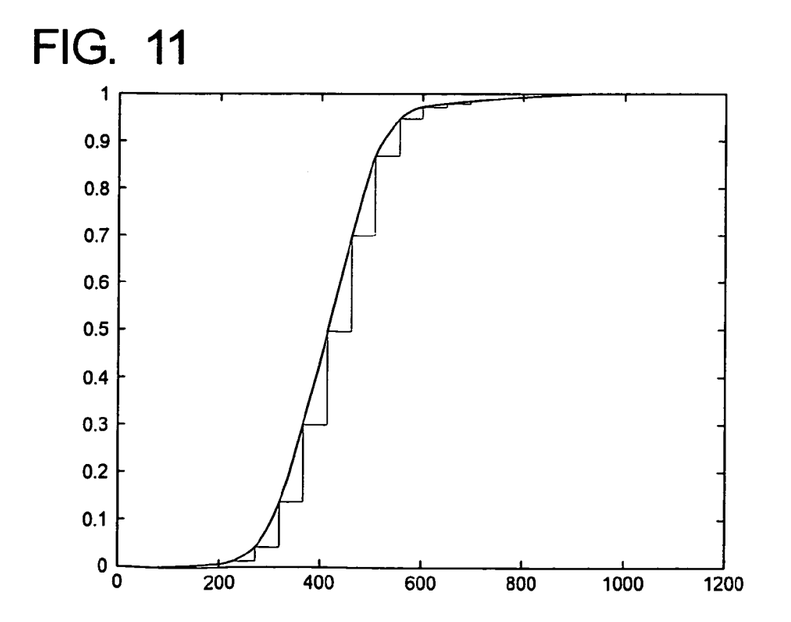
FIG. 11 is a diagrammatic representation of exemplary saved integrator values.

To determine the time at which the half-integrator value occurs, it is necessary to record the integration values at various sample points over the integration interval, wherein the integration interval is defined by the integration window. One convenient sample interval is the same as the sync mark-to-sync mark interval. This sample interval "frames" a sync mark and, therefore, is known as the frame interval (or frame). The spiral energy integration value is determined at each frame interval and accumulated, so that the time of the reader position can be calculated after the entire spiral has passed under the reader. An example of saved integrator values is shown in FIG. 11. It should be noted that the values in FIG. 11 do not correspond to the read signal envelope of FIG. 8. Instead, the values in FIG. 11 are based on an altogether different read signal envelope.

Figure 12:
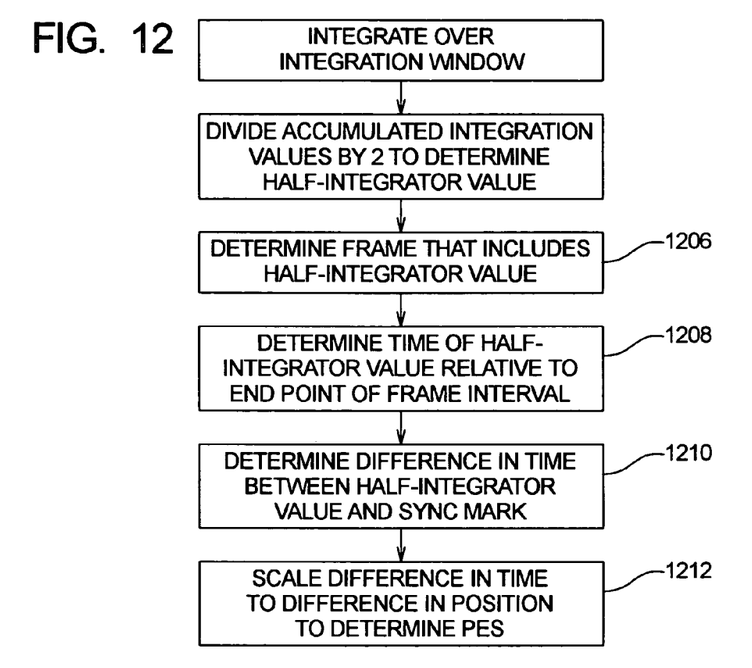
FIG. 12 is a simplified flowchart illustrating some of the steps required to demodulate the position of the reader using a single-point demodulation technique.

FIG. 12 is a simplified flowchart illustrating some of the steps required to demodulate the position of the reader. To reference the position of the reader relative to a sync mark, the time at which each occurs must be known. The time of the reader position is found by searching the array of integrator values to find the corresponding frame interval containing the half-integrator value (step 1206). Linear interpolation is used to find the exact time of the half-integrator value relative to one of the end points of the frame interval (step 1208). The interpolation uses the saved integrator values on either side of the half-integrator value to compute a localized slope of the integrator around the head position. The localized slope calculation incorporates the change in integrator values over a known distance.

To reference the reader position to the known reference points in the spiral, the time is saved at which each sync mark is detected. Because the frame interval is the same as the sync to sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the reader position and (2) the beginning of the frame interval to the sync position (step 1210). The difference in time is then scaled to position by the relationship between the sync-to-sync spacing of radius and time (step 1212).

Once the reader position is referenced to a sync mark, a determination must be made as to whether the reader position and the sync mark are the desired, or targets, of the track following system. If the reader position is found to be 10% away from a sync mark, but the sync mark is actually 1 away from the target sync mark, then the sync to sync spacing must be added to the reader position to demodulate the full reader position. For example, if there were 4 sync marks per track, then the sync spacing is 25% of a track. If the reader position is found to be 10% away from a sync mark and the sync mark is 1 away from the target sync mark, then the position of the reader would be demodulated as 35% of a track away from the target location.

Figure 13A:
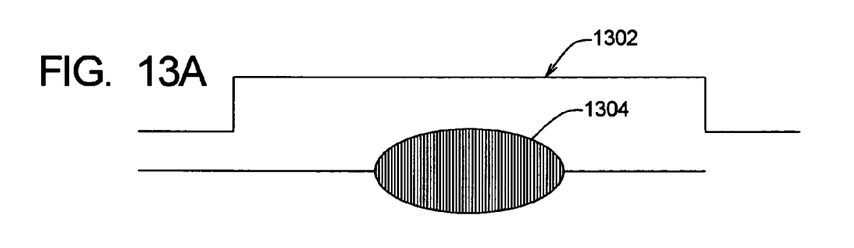
FIG. 13A is a schematic diagram illustrating a read signal envelope that is centered in an integration window.

FIG. 13A is a schematic representation of an integration window 1302 and a read signal envelope 1304. The integration window 1302 is opened around the expected position of the read signal envelope 1304. In FIG. 13A, the read signal envelope 1304 is centered in the integration window 1302. In such case, the position error signal (PES) would be zero.

Figure 13B:
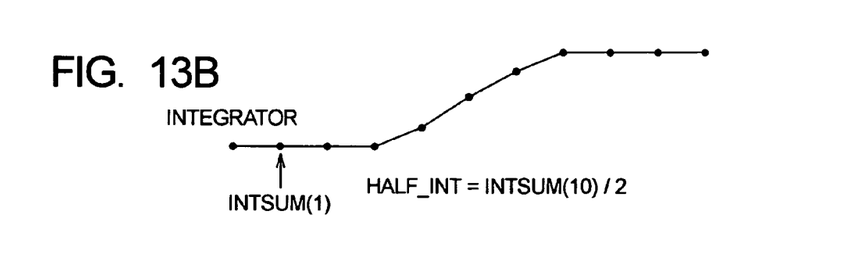
FIG. 13B is a schematic diagram illustrating a curve representing accumulated integration values across the integration window of FIG. 13A.

FIG. 13B is a schematic illustration of a curve representing accumulated integration values across the integration window. Because the reference position of the reader is determined by integrating over the entire integration window and then dividing accumulated integration values by 2, if the amount of noise within the integration window is not equal on either side of the read signal envelope, the read signal will appear to be shifted to one side or the other of the integration window. Hence, it will appear that the read head is shifted to one side or the other of the integration window, even though, in fact, it may be centered in the integration window.

In FIG. 13B, the noise is equal (i.e., zero) in the integration window on both sides of the read signal envelope and the read signal envelope is centered in the integration window. Therefore, the half-integrator value will appropriately provide a position reference for the reader. It should be noted, however, that it is very unlikely that the read signal envelope will be centered in the integration window and that the noise will be exactly equal in the integration window on both sides of the read signal envelope. Accordingly, even assuming that the noise level is constant (but not zero), the error in the half-integrator value will be a function of where the read signal envelope appears in the integration window.

Figure 14A:
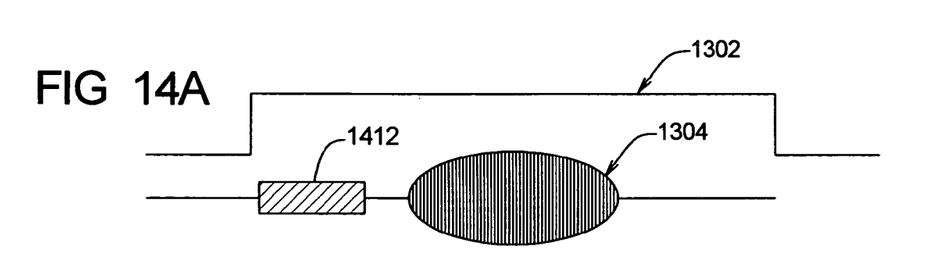
FIG. 14A is schematic diagram illustrating a read signal envelope that is centered in an integration window.
Figure 14B:
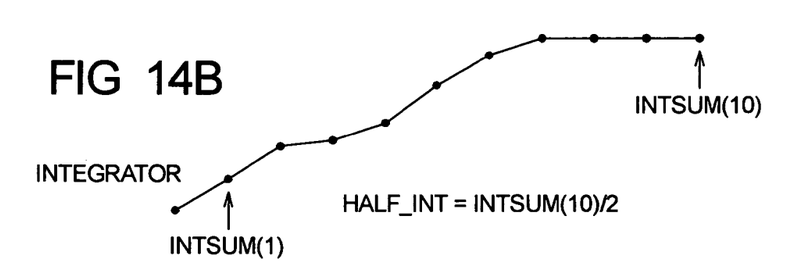
FIG. 14B is a schematic diagram illustrating a curve representing accumulated integration values across the integration window of FIG. 14A, where more noise is present in a left-half of the integration window than the right-half of the integration window.

Like FIG. 13A, FIG. 14A is a schematic illustration of a read signal envelope 1304 that is centered in an integration window 1302 (i.e. the PES should be zero). FIG. 14B is a schematic illustration of a curve representing accumulated integration values across the integration window. In this case, however, the noise is not equal on both sides of the read signal envelope. In fact, a larger amount of noise 1412 is present to the left of the read signal envelope 1304.

Accordingly, the half-integrator value will improperly indicate that the read signal envelope is to the left of the center of the integration window, which will result in a PES that is different from zero.

In view of the above, it would be desirable to develop a technique for demodulating the position of a reader with reduced noise to improve accuracy.

SUMMARY OF THE INVENTION

The present invention is designed to meet some or all of the aforementioned, and other, needs.

A method and apparatus for providing multi-point position demodulation of a read head using spiral-written servo information is disclosed. In one embodiment, a disk surface is provided with a read head associated therewith. The disk surface has spiral servo information written thereon and the read head generates a read signal envelope when reading the spiral servo information. A read signal envelope is detected within an integration window and integration values are accumulated over the integration window. The accumulated integration values are multiplied by a first number associated with a first integrator value and a second number associated with a second integrator value. A first position error signal associated with the first integrator value is determined, and a second position error signal associated with the second integrator value is also determined. A final position error signal, indicating the position of the read head relative to a position on the disk surface, is determined using the first position error signal associated with the first integrator value and the second position error signal associated with the second integrator value.

In one embodiment, the first position error signal and the second position error signal are averaged to obtain the final position error signal. By using multiple points in the integration window, noise may be reduced as compared to prior techniques which used a single point.

Other embodiments, objects, features and advantages of the invention will be apparent from the following specification taken in conjunction with the following drawings.

DETAILED DESCRIPTION OF THE PREFERRED EMBODIMENT

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to a method and apparatus for providing multi-point position demodulation of a read head when using spiral-written servo information. Instead of using a single point (i.e., only the half-integrator value) to demodulate the reader position, the inventors have recognized that it is possible to use multiple points in the integration window, along the integration curve, to demodulate the reader position. Furthermore, the inventors have recognized that there will be an overall noise reduction in demodulating the position of the reader using such multiple points.

Figure 15:
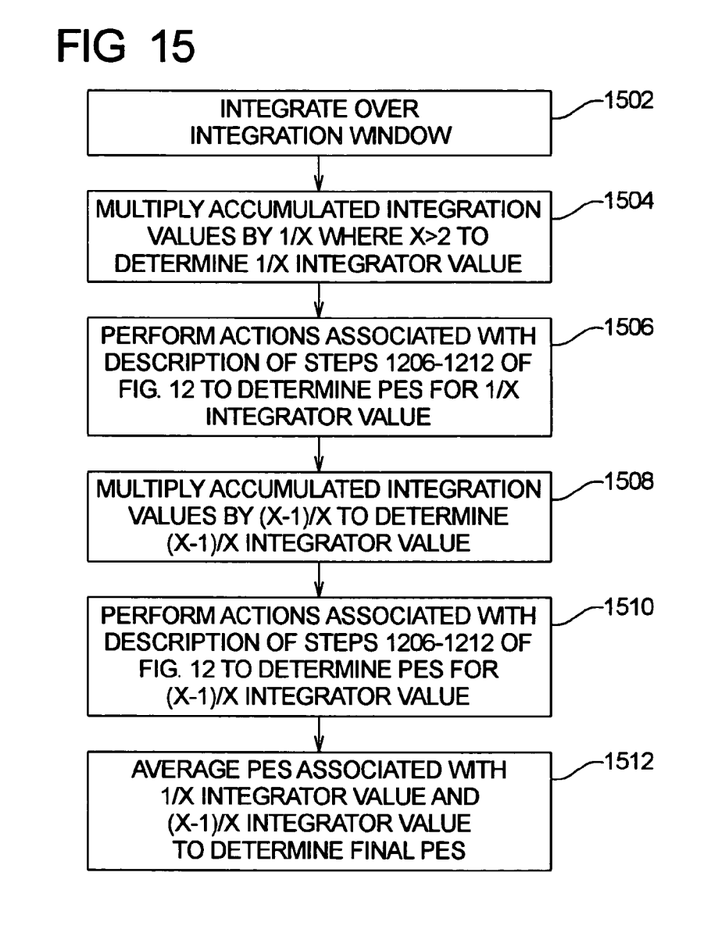
FIG. 15 is flowchart illustrating one embodiment of the present invention; and, FIG. 16 is an integration curve, similar to the integration curve of FIG. 9, which illustrates exemplary integrator values in accordance with one embodiment of the present invention.

A flowchart of one embodiment of the present invention is shown in FIG. 15, which may be contrasted with FIG. 12. Like FIG. 12, after the read signal envelope is integrated over an integration window and integration values are accumulated (step 1502). Next, the accumulated integration values are multiplied by 1/x, where x is any value greater than 2, to determine the 1/x integrator value, which provides a first reference position for the reader. Next, the PES for the 1/x integrator value is determined by comparing the position of the 1/x integrator value relative to one of the sync marks.

More specifically, integration values are recorded on a frame-by-frame basis and are accumulated. The time of the 1/x integrator value is determined by searching the array of integrator values to find the corresponding frame interval containing the 1/x integrator value. Linear interpolation is used to find the exact time of the 1/x integrator value relative to one of the end points of the frame interval. The interpolation uses the saved integrator values on either side of the 1/x integrator value to compute a localized slope of the integrator around the 1/x integrator value. The localized slope calculation incorporates the change in integrator values over a known distance.

To reference the 1/x integrator value to the known reference points in the spiral, the time is saved at which each sync mark is detected. Because the frame interval is the same as the sync-to-sync interval, a clock is started at the beginning of each frame to count the time from the beginning of the frame to when a sync mark is detected. This time may also be saved in an array similar to the integrator values. A computation is then performed to determine the difference in time from (1) the beginning of the frame interval to the 1/x integrator value and (2) the beginning of the frame interval to the sync position. The difference in time is then scaled to position by the relationship between the sync-to-sync spacing of radius and time.

Once the 1/x integrator value is referenced to a sync mark, a determination must be made as to whether the sync mark is the desired, or target sync mark, of the track following system. If it is not, appropriate sync-to-sync spacing must be added to determine the PES for the 1/x integrator value. The above actions are similar to those associated with the description of steps 1206–1212 of FIG. 12 (step 1506).

Referring again to FIG. 15, the accumulated integration values (of step 1502) are multiplied by (x–1)/x to determine the (x–1)/x integrator value, which provides a second reference position for the reader (step 1508). Next, the PES for the (x–1)/x integrator value is determined by comparing the position of the (x–1)/x integrator value relative to one of the sync marks in a fashion similar to that described above in connection with the 1/x integrator value (step 1510).

Finally, the PES associated with the 1/x integrator value and the PES associated with the (x–1)/x value are averaged to determine a final PES for the read head (step 1512). A control signal may be sent in response to the final PES to ensure proper track following.

Figure 16:
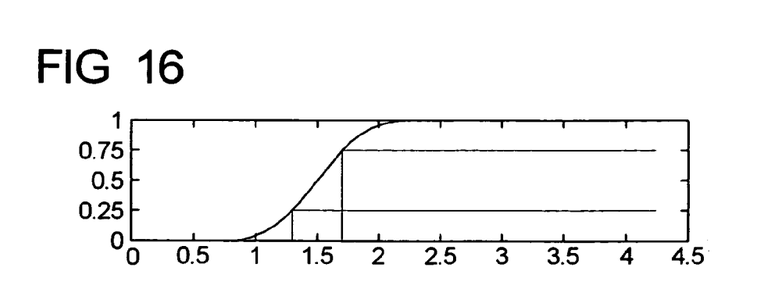

To provide a more specific example in connection with FIG. 15, suppose that x=4. Accordingly, the embodiment of the invention described in connection with FIG. 15 would determine the ¼ integrator value and the ¾ integrator value. FIG. 16 is a diagrammatic illustration similar to FIG. 9, which illustrates an integration curve 902 in normalized units. The ¼ integrator value and the ¾ integrator value are also shown in FIG. 16.

Returning to FIG. 15, the PES associated with the ¼ integrator value and the PES associated with the ¾ integrator are determined and then averaged to provide a final PES for the read head (akin to the PES associated with the ½ integrator value). However, as compared to the PES associated with the ½ integrator value, the noise is reduced.

Instead of using only using two points, more than two points may be used. For example, in addition to using the ¼ integrator value and the ¾ integrator value, the ⅓ integrator value and the ⅔ integrator value may also be used. This will cause a further decrease in noise. In general, the noise will be decreased by a factor of $\sqrt{n}$, where n is the number of integrator values that are used.

Multiple integrator values may also be used for other valuable purposes. For example, multiple integrator values may be used to determine relative changes in spiral width along a spiral. The spiral width is related to the combination of the spiral velocity, the reader width and the writer width. Accordingly, if the relative spiral width can be determined and any two of the three variables (i.e., spiral width, reader width, and writer width) are known, then relative values of the third variable can be determined. For example, if the relative spiral width can be determined and both the reader width and writer width are known to be constant, then the relative spiral velocity can be determined along a spiral.

The relative spiral width may be measured by choosing two arbitrary points as defining a width of a spiral. For example, the distance between the ¼ integrator value and the ¾ integrator value can arbitrarily be a measure of the spiral width. Relative measurements of the spiral width may be obtained by measuring the distance between the ¼ integrator value and the ¾ integrator value at different locations along a spiral.

If, as in most disk drives, the reader width is not changing and the writer width is not changing (except for changes in skew angle, which can be accommodated, as will be understood by those skilled in the art), relative measurements of the spiral velocity may be determined at various radiuses. Accordingly, the spiral velocity along a spiral may be characterized.

The assignee of the present invention has developed a technique for writing spirals of servo information using a STW, but then writing final servo patterns (which look like the conventional patterns shown in FIG. 3) using the disk drive itself. That is, using the spirals of servo information, the disk drive performs a self-servo writing operation, so that its disks are formatted in a fashion that is substantially identical to disks that are formatted using a STW.

In one embodiment of the present invention, once the spiral velocity has been characterized along one or, preferably all, of the spirals, such information may be used when writing final servo patterns (like those of FIG. 3) on the disk surface. Accordingly, if one or more of the spirals of servo information varied from the constant velocity or velocity profile at which it was supposed to have been written, the relative measurements of the spiral velocity may be used to correct for such variations. By doing so, errors in writing the spirals of servo information would not be correspondingly propagated when writing the final servo patterns.

In the case of conventional servo patterns, during the servo track writing process, the write head is subjected to non-repeatable motion which is written into the generally circular track. This repeatable run-out (RRO) is uncorrelated from track-to-track.

Many procedures have been developed to correct for RRO in the case of conventional servo patterns. However, such procedures are extremely time-consuming. For example, in one technique, the disk drive's transducer is positioned over a track and an average is taken of a position error signal (PES) over several revolutions (e.g., 20 revolutions per track). Thus, the non-repeatable portions of the measurements will be averaged out, thereby leaving only the RRO. A calculation is then performed in an effort to try to compensate for the RRO, so that the track appears nearly perfectly circular. This information may then be stored on the disk surface, for example. The process is then repeated for other tracks on the disk surface.

Because each spiral of servo information is written at different times, on different revolutions, adjacent spirals are non-coherent with one another. Accordingly, as a read head reads servo information along a circular track, repeatable runout (RRO) will appear to be extremely large from spiral-to-spiral. Importantly, however, adjacent circular tracks will have a RRO which is correlated. This is because the non-repeatable noise is written along a spiral.

The present invention may be used to measure the RRO at a first track in order to predict the RRO at an adjacent track. For example, if the ¼ integrator value and the ¾ integrator value were one track apart, the RRO could be determined at the ¼ integrator value and such RRO could be used as an estimation of the RRO at the ¾ integrator value (or visa-versa). Accordingly, the process for compensating for RRO can be shortened, thereby accelerating the manufacturing process.

More specifically, the expected PES may be calculated for a read head at a track prior to the read head being positioned (centered) at that track. The expected PES may be used in the RRO compensation process, thereby reducing the number of revolutions required for performing RRO calculations.

The ¼, ½ and ¾ integrator values are easily accomplished in digital signal processor calculations with register shifts. However, any other ratio of integrator values can also be used with fractional multiply instead of a register shift. Preferably, the present invention is algorithmically based, such that calculations are performed in the firmware or software.

It should be understood that the present invention is not limited by the manner in which spiral servo information is written onto the disk surface. Accordingly, the present invention may be used in conjunction with spiral servo information that has been placed on a disk surface using techniques associated with printed media or patterned media processes, among other processes.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a disk surface and a read head associated therewith, said disk surface having spiral servo information written thereon and said read head generating a read signal envelope when reading said spiral servo information;
detecting a read signal envelope within an integration window;
accumulating integration values over said integration window;
multiplying said accumulated integration values by a first number associated with a first integrator value;
multiplying said accumulated integration values by a second number associated with a second integrator value.

2. The method of claim 1 further including the step of:
determining a position error signal associated with the read head relative to a position on the disk surface using said first integrator value and said second integrator value.

3. The method of claim 1 further including the steps of:
determining a first position error signal associated with the first integrator value; and,
determining a second position error signal associated with the second integrator value.

4. The method of claim 3 further including the step of:
determining a final position error signal associated the read head using the first position error signal associated with the first integrator value and using the second position error signal associated with the second integrator value.

5. The method of claim 4 further including the step of:
averaging the first position error signal and the second position error signal to obtain the final position error signal.

6. The method of claim 1 wherein the first number is 1/x and the second number is (x−1)/x, where x is greater than 2.

7. The method of claim 1 wherein the first integrator value and the second integrator value are used to define a spiral width.

8. The method of claim 7 further comprising the step of:
measuring the spiral width at a plurality of radial locations on the disk surface.

9. The method of claim 8 further comprising the step of:
determining relative velocities at which the spiral was written using said measured spiral widths.

10. The method of claim 9 further comprising the step of:
compensating for undesired variations in relative spiral velocities when writing final servo patterns.

11. The method of claim 8 further including the step of:
recording said measured spiral widths in memory.

12. The method of claim 7 wherein the first number is 1/x and the second number is (x−1)/x, where x is greater than 2.

13. The method of claim 1 including the step of:
providing a write head having a write head width, said read head having a read head width;
determining a convoluted value of the reader width and the writer width using said first integrator value and said second integrator value.

14. The method of claim 1 further including the steps of:
estimating a position error signal associated with a position different from a current position of the read head using the first integrator value.

15. The method of claim 14 wherein the estimated position error signal is used in calculating repeatable runout for a position different from the current position of the read head.

16. A method comprising the steps of:
providing a disk surface and a read head associated therewith, said disk surface having spiral servo information written thereon and said read head generating a read signal envelope when reading said spiral servo information;
detecting a read signal envelope within an integration window;
accumulating integration values over said integration window;
multiplying said accumulated integration values by n different numbers associated with n different integrator values, where n is a natural number greater than two.

17. The method of claim 16 further including the step of:
determining a position error signal associated with the read head using said n different integrator values.

18. The method of claim 16 further including the step of:
determining n position error signals associated with said n different integrator values.

19. The method of claim 18 further including the step of:
determining a final position error signal associated with the read head using said n position error signals.

20. The method of claim 19 further including the step of:
averaging said n position error signals to obtain the final position error signal.

21. The method of claim 20 wherein noise is reduced by a factor of $\sqrt{n}$ relative to using only one integrator value to obtain the final position error signal.

22. An apparatus comprising:
a disk surface and a read head associated therewith, wherein said disk surface has spiral servo information written thereon and wherein said read head generates a read signal envelope when reading said spiral servo information;

circuitry for:
    detecting a read signal envelope within an integration window;
    accumulating integration values over said integration window;
    multiplying said accumulated integration values by a first number associated with a first integrator value;
    multiplying said accumulated integration values by a second number associated with a second integrator value; and,
    determining a position error signal associated with the read head relative to a position on the disk surface using said first integrator value and said second integrator value.

* * * * *